United States Patent
Zheng et al.

(10) Patent No.: US 8,165,474 B2
(45) Date of Patent: Apr. 24, 2012

(54) REDUCING CROSS MODULATION IN MULTICHANNEL MODULATED OPTICAL SYSTEMS WITH ANTI-CLIPPING

(75) Inventors: Jun Zheng, Houston, TX (US); Brian Ishaug, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 1002 days.

(21) Appl. No.: 12/053,104

(22) Filed: Mar. 21, 2008

(65) Prior Publication Data

US 2009/0237171 A1 Sep. 24, 2009

(51) Int. Cl.
 *H04B 10/00* (2006.01)
 *H04L 12/26* (2006.01)
 *H04J 14/02* (2006.01)
 *G06K 7/10* (2006.01)

(52) U.S. Cl. ........ 398/193; 398/182; 398/183; 398/194; 370/241; 370/251; 375/227; 375/224; 375/231; 375/284

(58) Field of Classification Search .................. 398/193, 398/182
See application file for complete search history.

(56) References Cited

U.S. PATENT DOCUMENTS

| | | | |
|---|---|---|---|
| 4,242,636 A | | 12/1980 | Gilmer et al. |
| 4,710,723 A | * | 12/1987 | Pelchat et al. ............... 332/183 |
| 5,027,402 A | * | 6/1991 | Richards et al. ............... 381/10 |
| 5,090,291 A | | 2/1992 | Schwartz |
| 5,187,713 A | | 2/1993 | Kwa |
| 5,343,843 A | | 9/1994 | Hamren |
| 5,548,109 A | * | 8/1996 | Butturini et al. ......... 235/462.27 |
| 5,600,472 A | | 2/1997 | Uesaka |
| 5,614,851 A | * | 3/1997 | Holzer et al. ................... 327/58 |
| 5,661,580 A | | 8/1997 | Yamada |
| 5,680,238 A | * | 10/1997 | Masuda ........................ 398/76 |
| 5,689,356 A | | 11/1997 | Rainal |
| 5,694,386 A | * | 12/1997 | Hirajima et al. ........... 369/47.25 |
| 5,751,531 A | | 5/1998 | Rault |
| 6,061,161 A | | 5/2000 | Yang et al. |
| 6,118,479 A | | 9/2000 | Maeda et al. |
| 6,181,453 B1 | * | 1/2001 | Darcie et al. .................. 398/201 |
| 6,211,984 B1 | | 4/2001 | Yoshida |
| 6,377,552 B1 | * | 4/2002 | Moran et al. .................. 370/241 |
| 6,404,241 B1 | * | 6/2002 | Ackerman ...................... 327/58 |
| 6,549,316 B2 | | 4/2003 | Blauvelt |
| 6,559,994 B1 | | 5/2003 | Chen et al. |

(Continued)

OTHER PUBLICATIONS

Pophillat, "Optical Modulation Depth Improvement in SCM Lightwave Systems Using a Dissymmetrization Scheme," IEEE Photonics Technology Letters, vol. 6 No. 6, Jun. 1994 (4 pages).

(Continued)

*Primary Examiner* — Shi K Li
*Assistant Examiner* — Oommen Jacob
(74) *Attorney, Agent, or Firm* — Grossman Tucker Perreault & Pfleger, PLLC; Norman S. Kinsella

(57) ABSTRACT

A modulated optical system with anti-clipping reduces or corrects clipping that might occur in the laser as a result of negative spikes or peaks in a multichannel RF signal. The system generally detects an envelope of the RF signal to generate an anti-clipping signal that follows at least a portion of the envelope and prevents one or more negative peaks from causing clipping by adjusting a bias current in response to the anti-clipping signal. The system may also reduce cross modulation by clamping the anti-clipping signal at an anti-clipping limit during lower power periods of the RF signal.

9 Claims, 9 Drawing Sheets

U.S. PATENT DOCUMENTS

| | | | |
|---|---|---|---|
| 6,727,761 | B1 | 4/2004 | Apel |
| 6,728,277 | B1 | 4/2004 | Wilson |
| 7,038,543 | B2 | 5/2006 | Nguyen et al. |
| 7,573,923 | B2 * | 8/2009 | Zheng ................. 372/38.07 |
| 7,873,285 | B2 * | 1/2011 | Zhou et al. ............. 398/192 |
| 2002/0063930 | A1 | 5/2002 | Blauvelt |
| 2003/0081667 | A1 | 5/2003 | Camnitz |
| 2003/0090289 | A1 | 5/2003 | Morley et al. |
| 2004/0056720 | A1 | 3/2004 | Jansen et al. |
| 2004/0189393 | A1 * | 9/2004 | Nguyen et al. .......... 330/279 |
| 2004/0239428 | A1 * | 12/2004 | Apel ..................... 330/279 |
| 2006/0056327 | A1 * | 3/2006 | Coersmeier ............ 370/315 |
| 2006/0078339 | A1 | 4/2006 | Ng et al. |
| 2006/0208779 | A1 | 9/2006 | Lin et al. |
| 2009/0237171 | A1 * | 9/2009 | Zheng et al. ........... 332/151 |

OTHER PUBLICATIONS

Ciciora, et al., "Modern Cable Television Technology; Video, Voice, and Data Communications, Second Edition" Morgan Kaufmann Publishers (pp. 530-556).

U.S. Office Action dated Jul. 8, 2010 issued in related U.S. Appl. No. 11/753,082.

U.S. Office Action dated Jul. 20, 2010 issued in related U.S. Appl. No. 11/753,162.

PCT Search Report and Written Opinion in related Application No. PCT/US08/64682 dated Jul. 22, 2008, 8 pgs.

PCT Search Report and Written Opinion in related Application No. PCT/US08/64684 dated Jul. 23, 2008, 9 pgs.

US Office Action dated Aug. 6, 2008 in related U.S. Appl. No. 11/775,409, 9 pgs.

U.S. Office Action dated Oct. 29, 2009 issued in related U.S. Appl. No. 11/753,082.

U.S. Office Action dated Oct. 30, 2009 issued in related U.S. Appl. No. 11/753,162.

U.S. Office Action dated Feb. 15, 2011 issued in related U.S. Appl. No. 11/753,082.

* cited by examiner

REDUCING CROSS MODULATION IN MULTICHANNEL MODULATED OPTICAL SYSTEMS WITH ANTI-CLIPPING

TECHNICAL FIELD

The present invention relates to modulated optical systems and more particularly, to a system and method for reducing cross modulation in multichannel modulated optical systems with anti-clipping.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band RF signal. In this case, the electrical current that drives or pumps the laser is modulated with the wide-band RF signal. The relationship between the light output and the input current for such a laser may be represented using a transfer curve or L-I (light-current) curve. The set point of the L-I curve may be selected so as to maximize the linearity of the laser output in response to the modulation, within the expected range of operation of the output produced by the laser. Although the laser output may be generally linear along a significant portion of the L-I curve, the light output may attain a zero-power level when the input current falls below a threshold current level, which results in an effect known as clipping.

In a communications system where multiple channels are transmitted, such as a CATV system, multiple analog signals corresponding to the multiple channels may be combined into a wide-band multichannel RF signal, which drives a laser to produce a multichannel modulated optical signal. The multiple analog signals may include multiple modulated analog carriers that may be combined, for example, using frequency division multiplexing techniques. One or more digital signals modulated using digital modulation, such as quadrature amplitude modulated (QAM), may also be combined with the modulated analog carrier signals, for example, using subcarrier multiplexing (SCM) techniques. In some systems, for example, as many as 110 channels may be transmitted over a frequency range of about 50 MHz to 750 MHz.

Because the modulation may carry several channels of information at different frequencies, there may be a very large swing of the input drive current in either direction. When many signals are summed and are randomly distributed in both frequency and phase, the ratio of peak-to-average voltage rarely exceeds 14 dB (though with occasional higher peaks). In a CATV system, however, the downstream spectrum is not random. Peak voltage conditions may occur, for example, when a large number of carriers are harmonics of a common root frequency and the carrier phases are aligned. In that case, the time domain waveform can resemble a string of impulses spaced by a time interval equal to the period of the common root frequency. As a result of this occasionally occurring peak voltage (and thus peak drive current) condition, the laser may be driven into hard limiting, causing clipping, when a sufficient number of carriers are in phase alignment. This is particularly true in the case of directly modulated laser diodes, as described above, where a sharp knee occurs in the transfer function below which the light output reaches a zero-power level.

In other words, there will be clipping when the instantaneous sum of various signals causes the drive current to swing too far in the "downward" direction and below the threshold current that turns on the laser. When such clipping occurs, intermodulation products (i.e., clipping-induced distortion) and noise may be generated, which may result in bit errors in the optical output of the laser. Systems including a digital signal (e.g., a QAM signal) added to the analog channels are even more sensitive to noise arising from clipping.

Each channel in a multichannel optical communications system may be driven or modulated up to a certain maximum optical modulation index (OMI). In general, a higher OMI per channel increases the channel-to-noise ratio (CNR). Driving the individual channels too much, however, may cause clipping when the channels line up, as described above. In some systems, each channel cannot be driven more than about 2 to 3% OMI because, if the channels were to line up, the total modulation of the laser would substantially exceed 100%. If clipping could be reduced or eliminated, increasing the OMI per channel would be possible to improve CNR.

One approach to reducing or preventing clipping is to detect an envelope of the RF signal and to change the bias current to the laser in response to the detected envelope. This approach may result in large swings of bias current, however, during periods of significantly lower power in the RF signal. This may have undesirable effects, such as causing or contributing to cross modulation. Cross modulation occurs when the nonlinearities of a system result in a carrier in a multicarrier system (i.e., a multichannel RF signal) being modulated by the various signals carried on other channels in the same system. In a CATV system, for example, a group of video carriers may modulate other video carriers in a multichannel video system. Varying the bias current in response to the detected envelope may contribute to cross modulation, for example, when the RF signal has alternating periods of higher power and lower power.

BRIEF DESCRIPTION OF THE DRAWINGS

These and other features and advantages will be better understood by reading the following detailed description, taken together with the drawings wherein.

DETAILED DESCRIPTION

Figure 1:
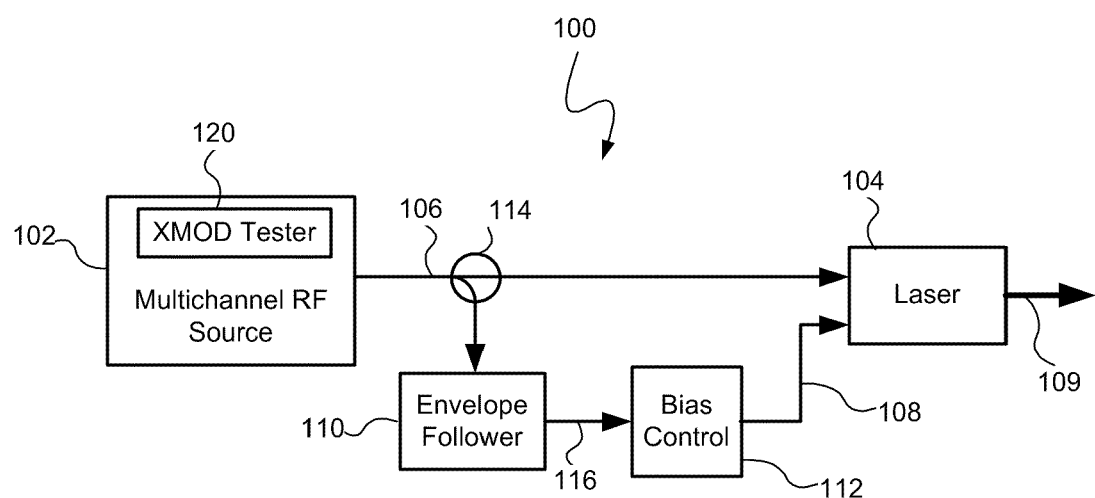
FIG. 1 is a functional block diagram of a multichannel modulated optical system with anti-clipping, consistent with embodiments of the present invention.

Referring to FIG. 1, a modulated optical system 100 with anti-clipping, consistent with embodiments of the present invention, is capable of providing both reduced clipping and reduced cross modulation. The modulated optical system 100 generally includes a laser 104 that receives a multichannel RF signal 106 from a multichannel RF source 102. The laser 104 may include a RF input that receives the multichannel RF signal 106, a bias current input that receives a bias current 108, and an optical output that produces a modulated optical signal 109 in response to the RF signal 106 and the bias current 108. The system 100 may also include other circuitry and/or components (not shown) between the multichannel RF source 102 and the laser 104 such as, for example, one or more predistortion circuits and a laser driver circuit.

By adjusting the bias current 108 in response to an envelope of the multichannel RF signal 106, the system 100 reduces or corrects clipping that might occur in the laser 104 as a result of negative spikes or peaks in the multichannel RF signal 106. As used herein, to reduce or correct clipping means to prevent one or more negative spikes or peaks in the multichannel RF signal 106 from causing clipping in the laser 104 and does not require a complete elimination of clipping.

The system 100 generally includes an envelope follower 110 that receives the multichannel RF signal 106 from the multichannel RF source 102 and a bias control 112 that controls the bias current 108 provided to the laser 104. The envelope follower 110 may be coupled to the RF signal path, for example, using a splitter 114, such that the RF signal 106 is provided to the envelope follower 110 and to the laser 104. The envelope follower 110 detects an envelope of the multichannel RF signal 106 and produces an anti-clipping signal 116 following at least a portion of the detected envelope of the multichannel RF signal 106. The envelope follower circuitry 110 may also clamp the anti-clipping signal 116 at an anti-clipping limit when the power of the multichannel RF signal falls below a certain power level. Clamping the anti-clipping signal may reduce undesirable effects such as cross modulation, as will be described in greater detail below.

The bias control circuit 112 adjusts or varies the bias current 108 in response to the anti-clipping signal 116 that follows a portion of the detected envelope. In one embodiment, the bias current 108 may be adjusted or varied inversely proportional to a detected lower envelope of the multichannel RF signal 106. In particular, the bias current 108 may be increased as a lower envelope of the multichannel RF signal 106 falls and indicates a peak negative voltage condition. Thus, when the multichannel RF signal 106 falls below the threshold current of the laser as a result of a negative peak, the bias current 108 should be increased to a level that will prevent that negative peak and/or subsequent negative peak(s) from causing clipping.

The multichannel RF signal 106 may include multiple superimposed modulated analog carriers at different frequencies. The multiple modulated analog carriers may be modulated using modulation techniques known to those skilled in the art, such as amplitude modulation, and may be combined using multiplexing techniques known to those skilled in the art, such as frequency division multiplexing. The multichannel RF signal 106 may also include one or more digital signals modulated using digital modulation, such as quadrature amplitude modulation (QAM). The resulting multichannel RF signal 106 occupies a bandwidth across the range of frequencies of the multiple modulated carriers. Those skilled in the art will recognize that various modulation and multiplexing techniques may be used to generate the multichannel RF signal.

In one embodiment, the multichannel RF source 102 may include headend equipment in a CATV system and the multichannel RF signal 106 may be a downstream CATV signal. Examples of downstream multichannel CATV signals include 77 channels transmitted over a frequency range of about 50 MHz to 550 MHz and 110 channels transmitted over a frequency range of about 50 MHz to 750 MHz. Each channel in a downstream multichannel CATV signal may include a video carrier, a color subcarrier and an audio carrier. Other types of signals and frequency ranges may also be transmitted. The multichannel RF source 102 may also include cross modulation (XMOD) testing equipment 120 that modulates the carriers of the channels to test one or more of the channels for cross modulation, as will be described in greater detail below.

In the exemplary embodiment, the multichannel RF signal 106, which occupies a bandwidth across the range of frequencies of the multiple modulated carriers, directly modulates the laser 104. Each channel in the multichannel RF signal 106 may be driven or modulated up to a certain optical modulation index (OMI) depending upon a desired channel-to-noise ratio (CNR). In one embodiment, the OMI of at least some of the channels may be at least about 4% and more specifically about 5%. When multiple modulated carriers of the multichannel RF signal 106 align in phase, the sum of the voltage of the aligned carriers may result in a peak voltage condition. When the optical modulation index (OMI) of each channel exceeds a certain level (e.g., exceeding about 3% OMI per channel), the peak voltage condition may result in a higher occurrence of negative voltage spikes or peaks that cause the laser input current to fall below a threshold current of the laser 104, resulting in clipping.

Figure 2A:
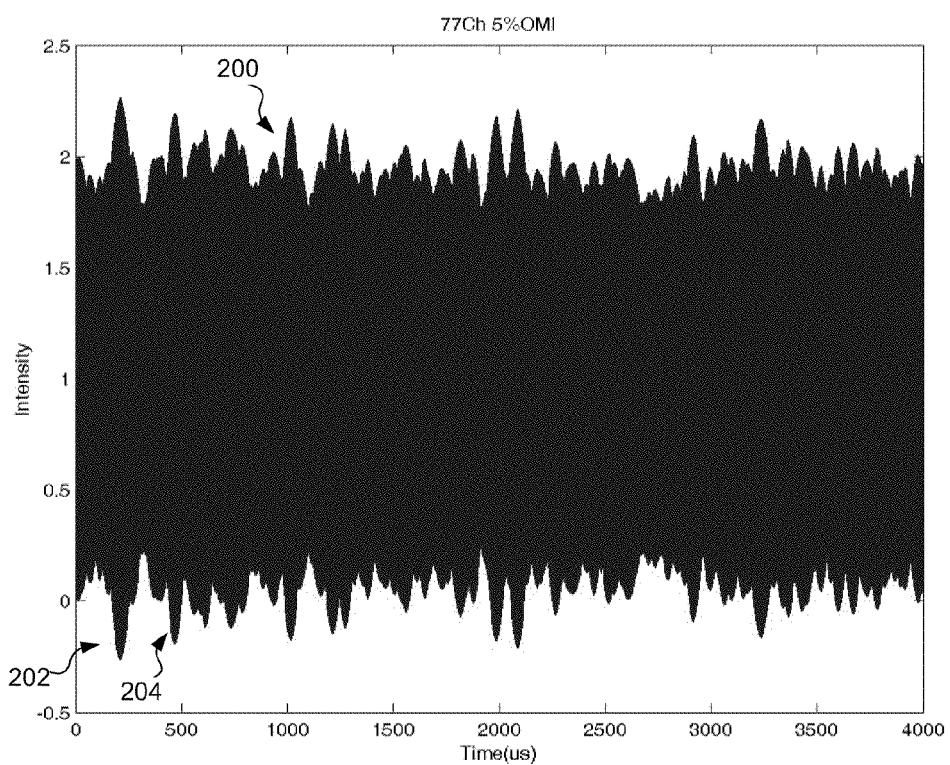
FIGS. 2A and 2B illustrate portions of an exemplary waveform of a multichannel RF signal in a multichannel modulated optical system.

Referring to FIGS. 2A-4B, the reduction of clipping by adjusting a bias current in response to an envelope of the RF signal is described in greater detail. FIGS. 2A and 2B illustrate an exemplary multichannel RF drive signal 200. The exemplary multichannel RF drive signal 200 represents 77 channels transmitted with 5% OMI per channel. FIG. 2A shows the RF drive signal 200 over a period of about 4000 µs with a number of peak voltage conditions 202, 204 during which multiple modulated carriers align in phase.

Figure 2B:
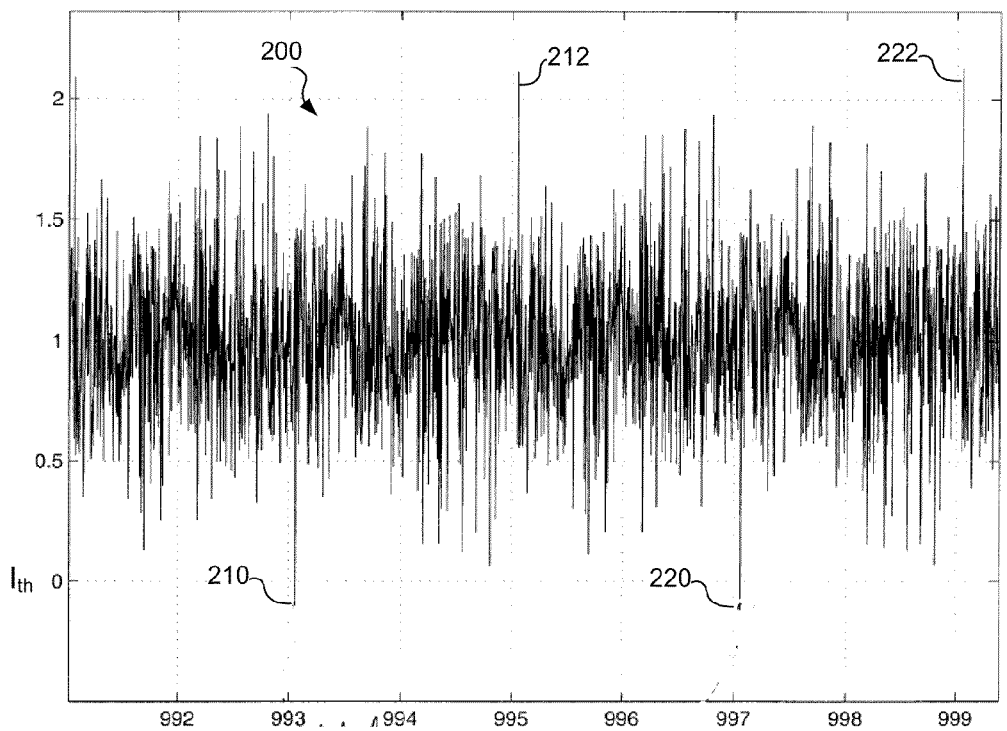

FIG. 2B shows the RF drive signal 200 over a smaller time period (i.e., about 10 µs) during a peak voltage condition. During the peak voltage condition shown in FIG. 2B, the multichannel RF drive signal 200 includes negative spikes or peaks 210, 220 that occur, for example, when carriers align to produce a relatively large swing in drive current in the negative direction. The negative spikes or peaks generally correspond to positive spikes or peaks 212, 222 produced by a corresponding relatively large swing in drive current in the positive direction. Clipping occurs when the negative spikes 210, 220 cause the drive current to fall below a threshold current ($I_{th}$) for the laser. In the exemplary RF drive signal 200, the negative peaks 210, 220 (and the resulting clipping)

occur periodically during the peak voltage condition (e.g., about every 4 microseconds (μs)).

Figure 3:
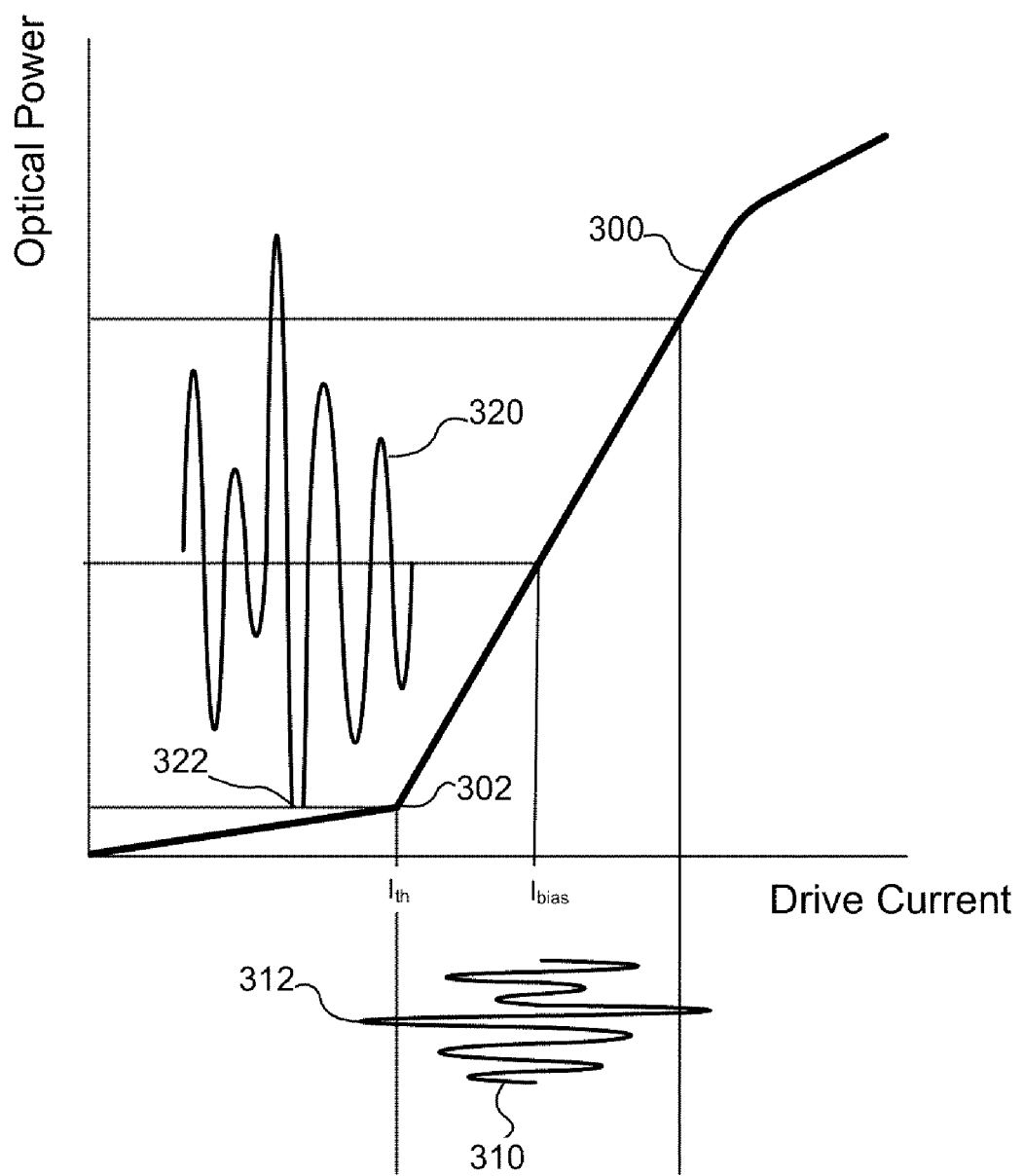
FIG. 3 illustrates a transfer curve showing the relationship between drive current and light output for a laser diode in which clipping occurs.

The laser 104 may include a semiconductor laser, such as a laser diode, having an L-I curve with a sharp knee or point at which the light output reaches a zero level when the input current falls below the threshold current ($I_{th}$). Referring to FIG. 3, a transfer curve 300 of one example of a laser diode illustrates the relationship between drive current (I) and light output (L) of a laser diode. RF signal input waveform 310 represents an RF input applied to the laser diode and optical output waveform 320 represents an optical output produced by the RF signal input. The point 302 (also referred to as the knee) of the transfer curve 300 represents a laser threshold point. When the drive current falls below a threshold current ($I_{th}$) corresponding to the laser threshold point, there is a sharp discontinuity in the light output. Thus, when the drive current of the RF signal input falls below the threshold current as represented by negative peak 312 in RF input waveform 310, the optical output abruptly stops as represented by the clipped peak 322 in the optical output waveform 320. As will be described in greater detail below, the clipped peak 322 may be prevented by increasing the bias current ($I_{bias}$) to prevent the peak 312 from falling below the threshold current ($I_{th}$).

Figure 7A:
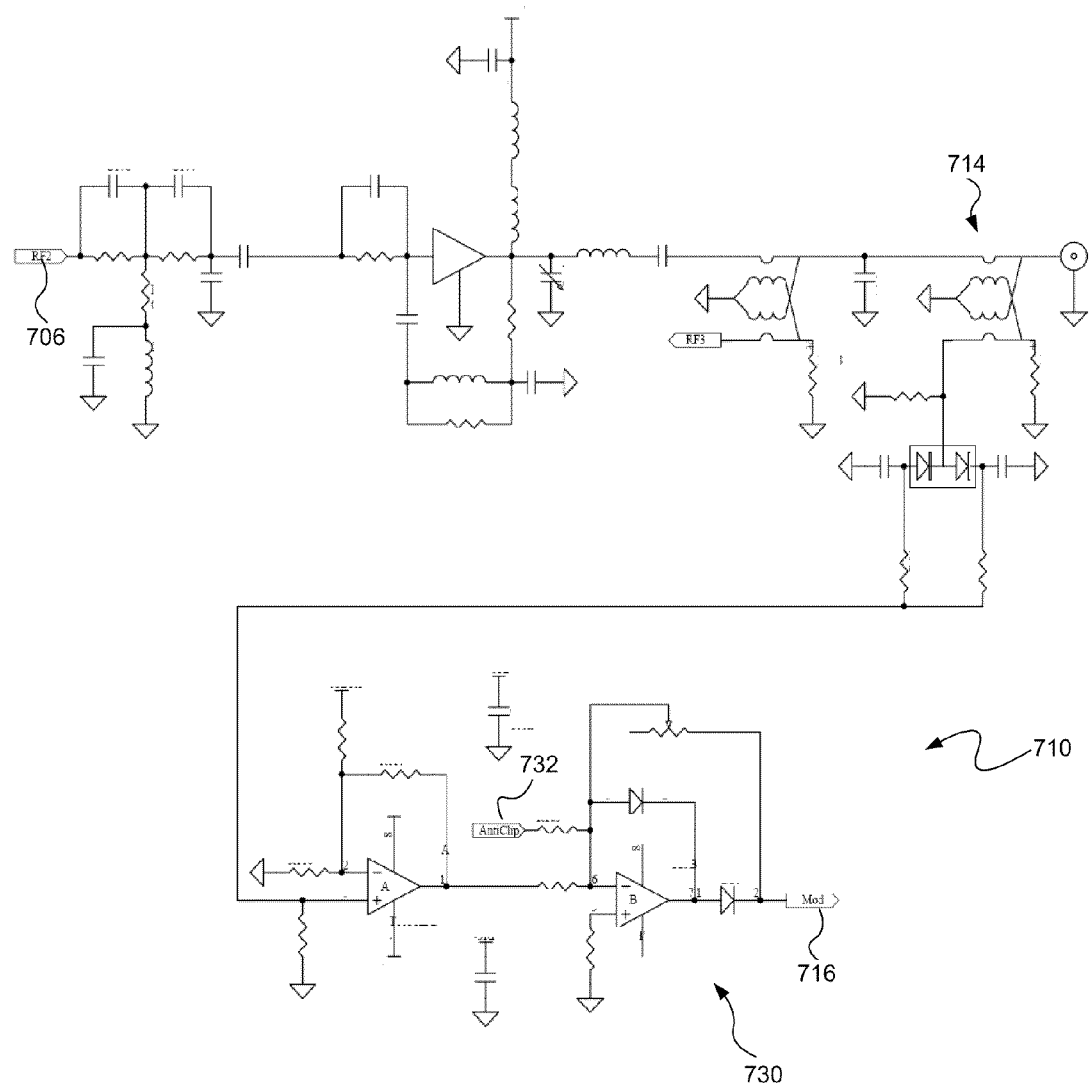
FIG. 7A is a schematic diagram of one implementation of envelope follower circuitry for generating an anti-clipping signal with an anti-clipping limit.

The envelope follower 110 may include envelope detection circuitry that has a response time fast enough to detect an envelope of a multichannel RF signal, such as the RF signal 200 shown in FIGS. 2A and 2B, having periodic peaks (e.g., every 4 μs). Envelope follower 110 may be implemented using known envelope detection circuitry such as, for example, a precision rectifier circuit and a low pass filter. One specific implementation of envelope detection circuitry capable of detecting the envelope of such a signal is shown in FIG. 7A and described in greater detail below. Embodiments of systems and methods for reducing clipping by adjusting bias current in response to an envelope of the RF signal are also described, for example, in U.S. patent application Ser. No. 11/753,082, which is fully incorporated herein by reference.

Figure 4A:
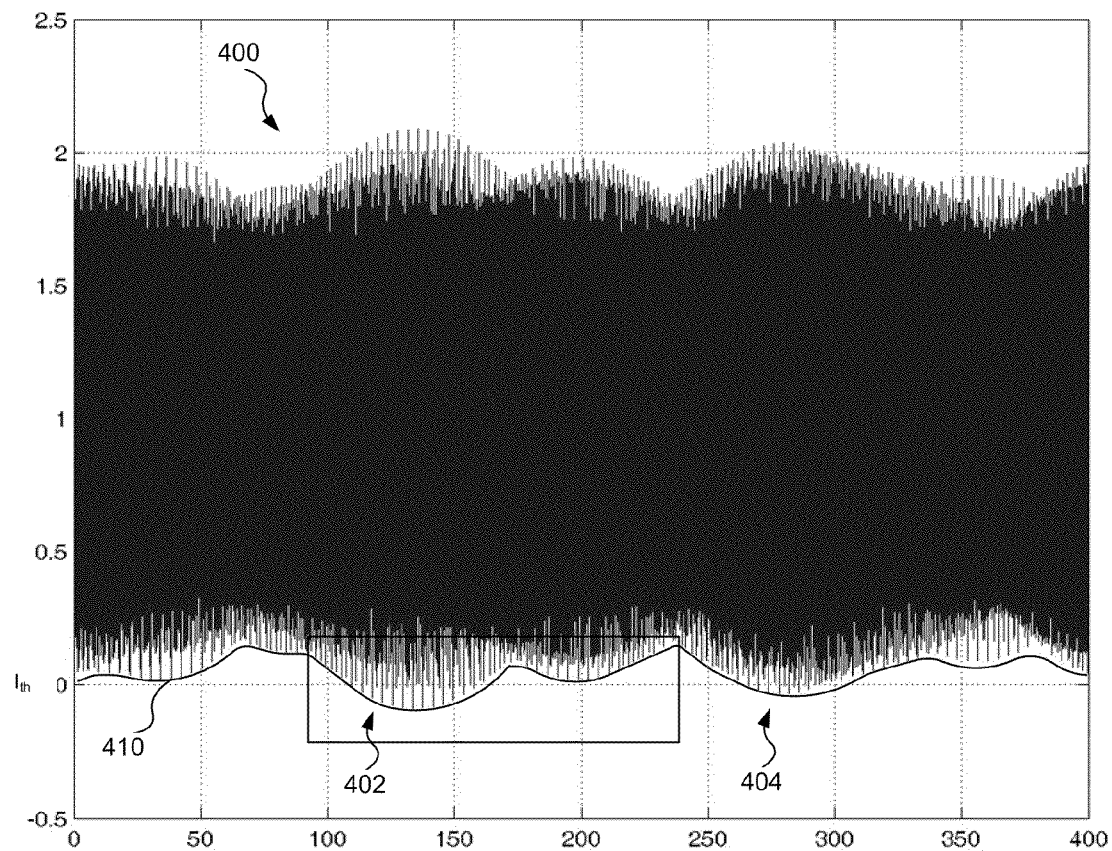
FIG. 4A illustrates a multichannel RF signal with a detected envelope.
Figure 4B:
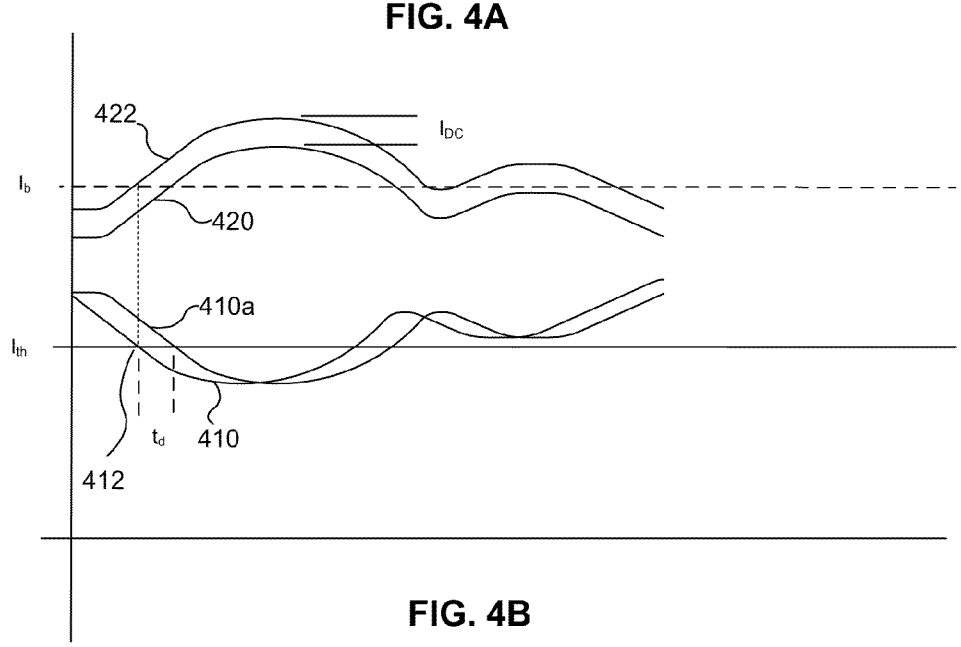
FIG. 4B illustrates a portion of the detected envelope from FIG. 4A together with a bias current responsive to the detected envelope.

FIGS. 4A and 4B generally illustrate an example of how bias current may be varied in response to an anti-clipping signal that follows an envelope of the RF signal. In this example, the anti-clipping signal is not clamped at an anti-clipping limit. FIGS. 4A and 4B are merely one illustration of an anti-clipping signal and corresponding bias current. An anti-clipping signal generated by an envelope follower and a bias current provided by a bias control in response to the anti-clipping signal may take various forms consistent with the embodiments described herein.

FIG. 4A illustrates an exemplary multichannel RF signal 400 and lower envelope 410 over a time period of about 400 μs. During portions 402, 404 of the RF signal 400, peak voltage conditions cause the input current to fall below a threshold current ($I_{th}$). The portions 402, 404 of the RF signal 400 may include a series of negative peaks below the threshold current ($I_{th}$). The negative peaks within the portions 402, 404 may occur generally periodically in the exemplary RF signal 400. The lower envelope 410 may be detected to produce an anti-clipping signal that follows the envelope 410.

FIG. 4B illustrates one example of an anti-clipping signal 410a that follows the lower envelope 410 for a section of the RF signal 400 together with a bias current 420 provided in response to the anti-clipping signal 410a. According to this example, when the anti-clipping signal 410a decreases, the bias current 420 increases by a corresponding amount. In other words, the bias current 420 is inversely proportional to at least a portion of the anti-clipping signal 410a. According to other embodiments, the anti-clipping signal generated from detecting the lower envelope may be inverted relative to the lower envelope such that the bias current increases and decreases proportional to at least a portion of the anti-clipping signal. In either case, the bias current 420 is varied inversely relative to the lower envelope 410 of the RF signal 400. Thus, when the lower envelope 410 falls below the current threshold ($I_{th}$), the bias current 420 should be increased to a point that will prevent at least some of the subsequent negative peaks from falling below the threshold current at the input to the laser, thus reducing or correcting clipping. A baseline bias current ($I_b$) may generally correspond to the bias current needed to provide required average optical power. The bias current 420 may thus be adjusted in response to the anti-clipping signal 410a such that the bias current rises above this baseline bias current ($I_b$) in response to the lower envelope 410 falling below the threshold current ($I_{th}$).

Because of the time required to detect the envelope 410 and to generate the anti-clipping signal 410a, a delay ($T_d$) may exist between the anti-clipping signal 410a generated from the detected envelope and the actual envelope 410 of the RF signal 400. As a result of the delay, the change in bias current 420 may lag behind the RF signal 400 and may not prevent clipping caused by one or more initial peaks. For example, when the actual envelope 410 of the RF signal 400 indicates that the RF signal 400 falls below the threshold current ($I_{th}$) at point 412, the bias current 420 may not be at the level needed to prevent clipping at that point. To account for the delay, according to one embodiment, a delay may be provided in the RF signal path such that the RF signal is delayed to reduce or eliminate this lag. According to another embodiment, a DC offset ($I_{DC}$) may be applied to the bias current 420 to produce an offset bias current 422 that compensates for the delay ($T_d$). The DC offset corresponds to the delay ($T_d$) such that the offset bias current 422 is at the bias current ($I_b$) when the actual envelope 410 falls below the threshold current ($I_{th}$) at point 412. The DC offset may be about 3% to account for a delay of about 10 μs.

Although the illustrated embodiment detects the lower envelope 410 of the RF signal 400, a system for reducing clipping may also detect the upper envelope to generate the anti-clipping signal because the waveform of the RF signal is generally symmetric. The system may similarly adjust the bias current in proportion to the detected upper envelope. A DC offset may similarly be applied to the bias current provided in response to the detected upper envelope to account for any delay between the detected upper envelope and the actual RF signal. Other techniques for varying bias current in response to a detected envelope of an RF signal may also be used to reduce clipping.

Figure 5A:
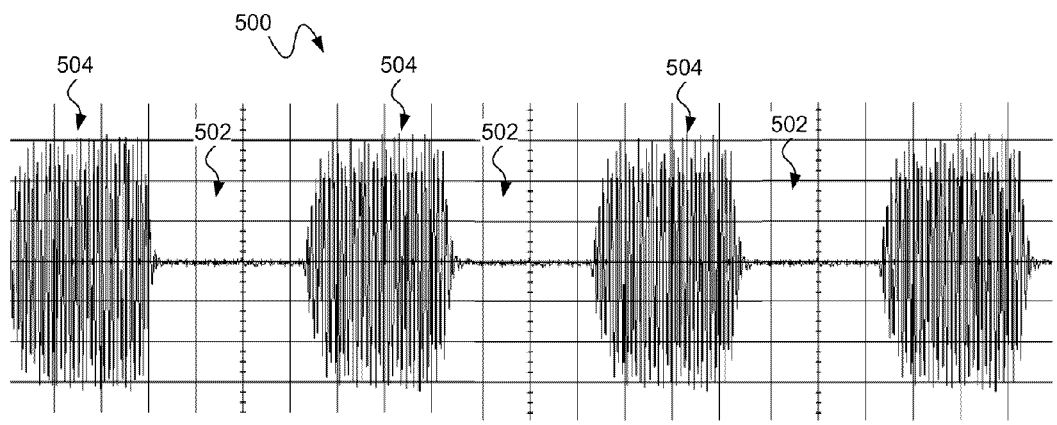
FIG. 5A illustrates a multichannel RF signal including carriers modulated with a square wave for purposes of cross modulation testing of a channel under test, consistent with an embodiment of the present invention.
Figure 5B:
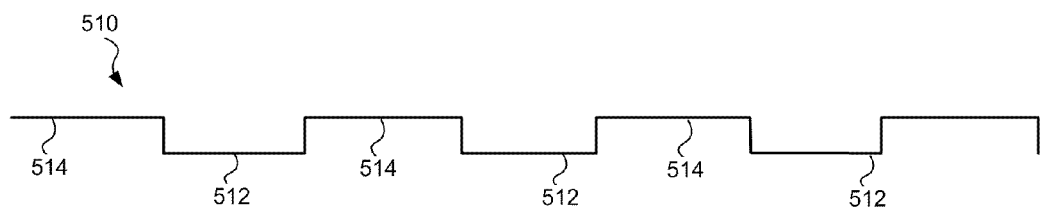
FIGS. 5B and 5C illustrate square waves indicative of cross modulation on the channel under test in FIG. 5A.
Figure 5C:
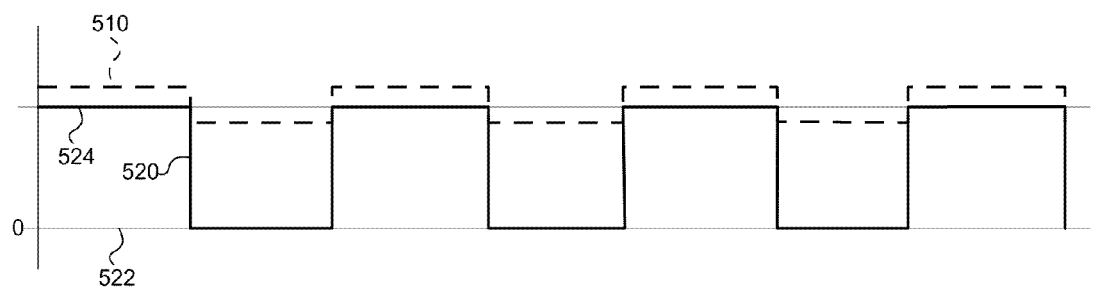

FIGS. 5A-5E illustrate one example how an anti-clipping signal can be bounded or clamped to reduce cross modulation in a modulated optical system with anti-clipping, such as the type described above. FIGS. 5A-5C illustrate one example of testing for cross modulation in a channel of a multichannel RF system. Cross modulation occurs when the nonlinearities of a system result in a carrier in a multi-carrier system (i.e., a multichannel RF signal) being modulated by the various signals carried on other channels in the same system. In a CATV system, for example, a group of video carriers may modulate other video carriers in a multichannel video system. Because each video channel contains a constant, high-level signal component at the horizontal line frequency (about 15.75 kHz in the NTSC system), this is the most noticeable component of cross modulation. To test for cross modulation in one channel (i.e., a channel under test), the carriers of the remaining channels are modulated using a square wave and the carrier of the channel under test is an unmodulated continuous wave. In one embodiment of a CATV system, for example, the carriers of the remaining channels are modulated to a depth of 100% by a square wave at the horizontal line-rate (e.g., 15.75 kHz) while the carrier of the channel under test (e.g., 547.25 MHz) is unmodulated. Thus, the cross modulation testing simulates what happens in an actual CATV signal where there are some "off" periods during the scan periods.

FIG. 5A illustrates a multichannel RF signal 500 including an unmodulated carrier of a channel under test and square wave modulated carriers of the remaining channels as described above. As a result of the square wave modulation, the RF signal 500 includes periods 502 of lower power and periods 504 of higher power (e.g., the modulated channels switch on and off) forming a pulsed RF signal. A change in CW (continuous wave) power of the channel under test between the lower power periods 502 and the higher power periods 504 (e.g., when the power of the modulated channels is switched on and off) is indicative of cross modulation. If there is no cross modulation, the CW power of the channel under test will be constant.

FIG. 5B illustrates a square wave 510 that is indicative of the cross modulation on the channel under test. The square wave 510 shows how the CW power of the channel under test changes when the other channels are switched on and off as a result of the square wave modulation. During the lower power periods 502 of the RF signal 500 (e.g., when the remaining channels are switched off), the channel under test is at a lower power, as indicated by the lower power periods 512 in the square wave 510. During the higher power periods 504 of the RF signal 500 (e.g., when the remaining channels are switched on), the channel under test is at a higher power as a result of the cross modulation, as indicated by the higher power periods 514 in the square wave 510. The cross modulation indicated by the square wave 510 may be quantified using a baseband analyzer (not shown) and measured in decibels (dB).

FIG. 5C illustrates the square wave 510 indicative of cross modulation together with a reference signal 520 representing the square wave modulation. The reference signal 520 also represents the power if the channel under test was itself modulated using the square wave that modulated the remaining channels. The axis 522 represents zero (0) power and the axis 524 represents the maximum power if the channel under test was being modulated. When the laser bias follows the envelope of the RF signal 500, the laser bias is modulated by a square wave similar to the signal 520. This square wave modulation of the laser bias may also cause the RF signal 500 to be modulated similar to the cross-modulation represented by the square wave 510. Thus, the anti-clipping signal may itself cause cross modulation.

Figure 5D:
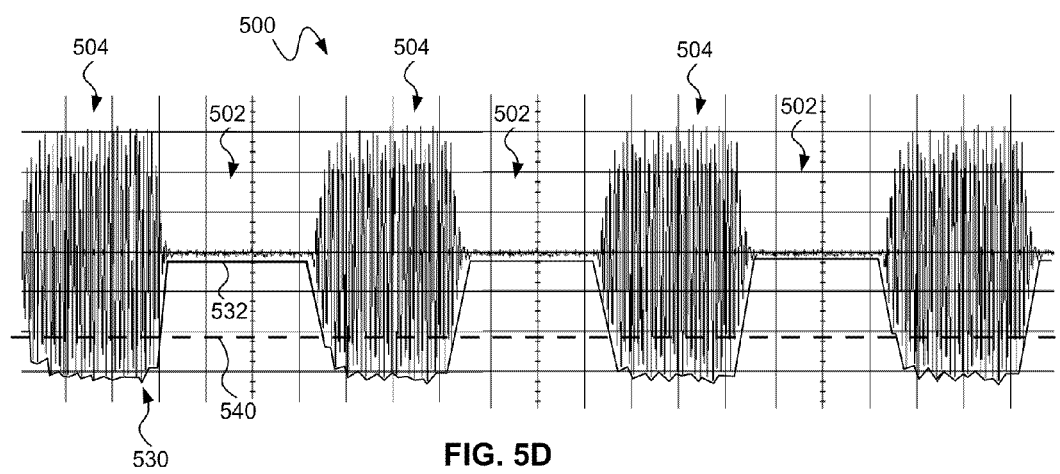
FIG. 5D illustrates the multichannel RF signal shown in FIG. 5A with an anti-clipping signal that follows the envelope of the multichannel RF signal.
Figure 5E:
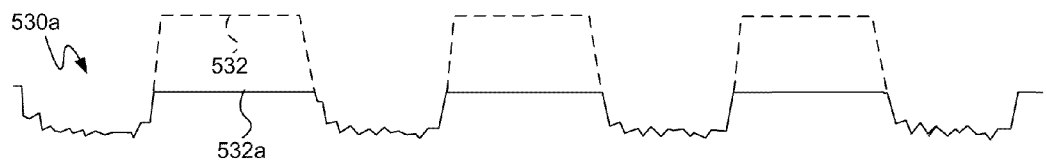
FIG. 5E illustrates a clamped anti-clipping signal that follows a portion of the envelope of the multichannel RF signal shown in FIG. 5D, consistent with embodiments of the present invention.

FIGS. 5D-5E further illustrate one example of generating an anti-clipping signal from the multichannel RF signal 500. As shown in FIG. 5D, if the envelope of the RF signal 500 is used to generate an anti-clipping signal 530, the anti-clipping signal 530 includes flat portions 532 during the lower power periods 502 of the RF signal 500 (e.g., where the remaining channels are switched off). When the bias current of the laser is adjusted in response to this anti-clipping signal 530, these flat portions 532 result in a large swing or fluctuation in the bias current and may cause or contribute to cross modulation. A possible cause of this cross modulation is the thermal effect that occurs when turning the channels on and off.

Because these flat portions 532 may cause or contribute to cross modulation and occur during periods where there is no clipping, the anti-clipping signal 530 may be bounded or clamped at an anti-clipping limit 540 during the lower power periods 502 of the RF signal 500 in which there is no clipping. Bounding or clipping the anti-clipping signal 530 thus reduces the large swing or fluctuation of the bias current in response to the anti-clipping signal 530. FIG. 5E shows the clamped anti-clipping signal 530a that is bounded or clamped at the anti-clipping limit 540. Thus, rather than follow the envelope of the RF signal 500 into the lower power periods 502, the flat portions 532a of the clamped anti-clipping signal 530a remain at a set level during these lower power periods 502.

Figure 6:
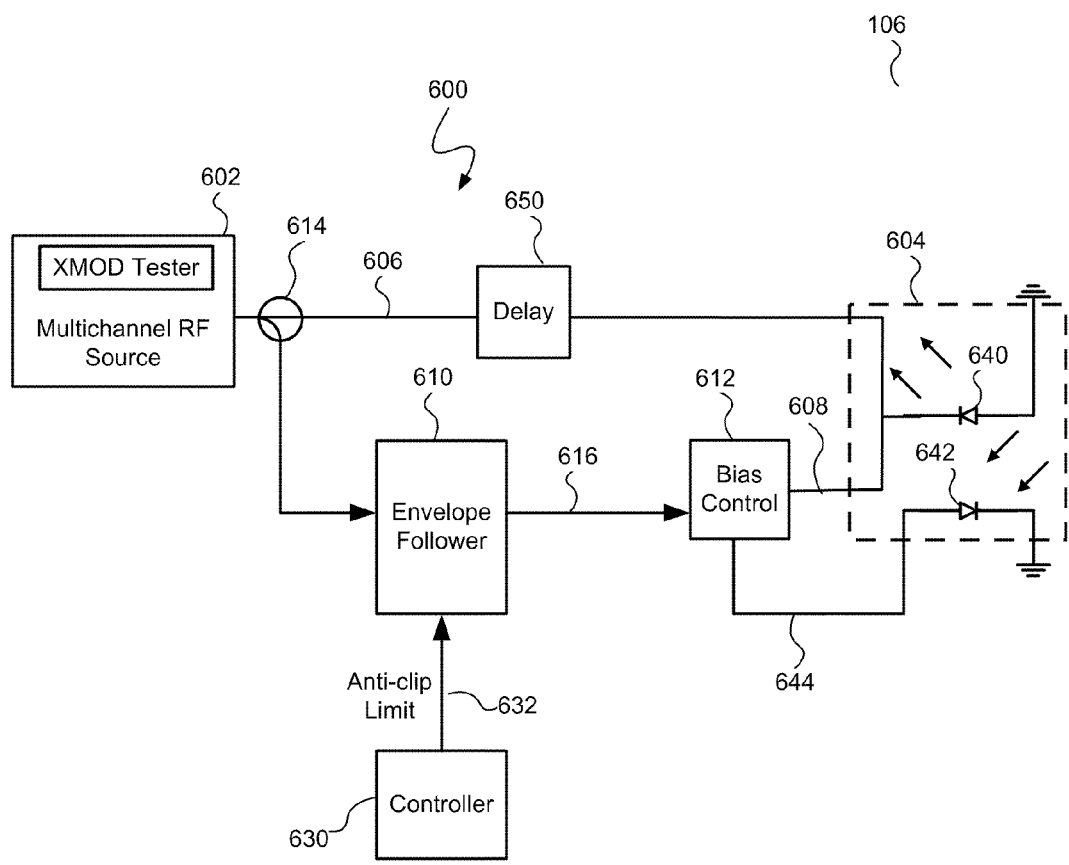
FIG. 6 is a functional block diagram of a multichannel modulated optical system with anti-clipping and an adjustable anti-clipping limit, consistent with embodiments of the present invention.

Referring to FIG. 6, another embodiment of a modulated optical system 600 with reduced clipping and reduced cross modulation may provide an adjustable anti-clipping limit. In this embodiment, a controller 630 provides an anti-clipping limit signal 632 to an envelope follower 610. The anti-clipping limit signal 632 indicates the anti-clipping limit. The envelope follower 610 thus receives the RF signal 606 provided by the RF signal source 602 and generates the anti-clipping signal 616 following a portion of the envelope of the RF signal 606 and clamped at the anti-clipping limit indicated by the anti-clipping limit signal 632 during the lower power periods of the RF signal 606. A bias control circuit 612 may then adjust the bias current 608 to the laser 604 in response to the anti-clipping signal 616 without large swings in bias current that may cause or contribute to cross modulation or other undesirable effects. The controller 630 may adjust the anti-clipping limit by varying the anti-clipping limit signal 632. Increasing the level of the limit signal 632 may reduce cross modulation. If the level of the limit signal 632 is too high, however, the anti-clipping signal 616 may be cut to reduce the anti-clipping effect. To optimize, therefore, the controller 630 may adjust the anti-clipping limit such that both clipping and cross modulation are eliminated or at least reduced to a desired level.

The bias control circuit 612 may adjust the bias current in response to the anti-clipping signal 616 in addition to other bias control functions such as bias control in response to a monitored power output of the laser 604. As shown in the embodiment of FIG. 6, for example, the laser 604 may include a laser diode 640 and a monitoring photodiode 642 that provides a power output monitoring signal 644 to the bias control circuit 612. The bias control circuit 612 may thus provide a bias current responsive to both the anti-clipping signal 616 and the power output monitoring signal 644.

The modulated optical system 600 may also include a delay 650 in the path of the RF signal 606 following the splitter 614. The delay 650 delays the RF signal 606 prior to input to the laser 604 to minimize or reduce the lag time of the adjustments of the bias current 650. As discussed above in connection with FIG. 4B, the bias current 608 provided by the bias control circuit 612 in response to the anti-clipping signal 616 generated from the detected envelope by the envelope follower circuit 610 may be delayed from and lag behind the actual envelope of the RF signal 606. The delay 630 may be used by itself, or in addition to the DC offset described above, to delay the RF signal 606 sufficient to reduce or effectively eliminate the lag between the varying bias current 608 and the RF signal 606 at the input to the laser 604. If the delay 650 is used in addition to the DC offset described above, the DC offset may be minimized.

Figure 7B:
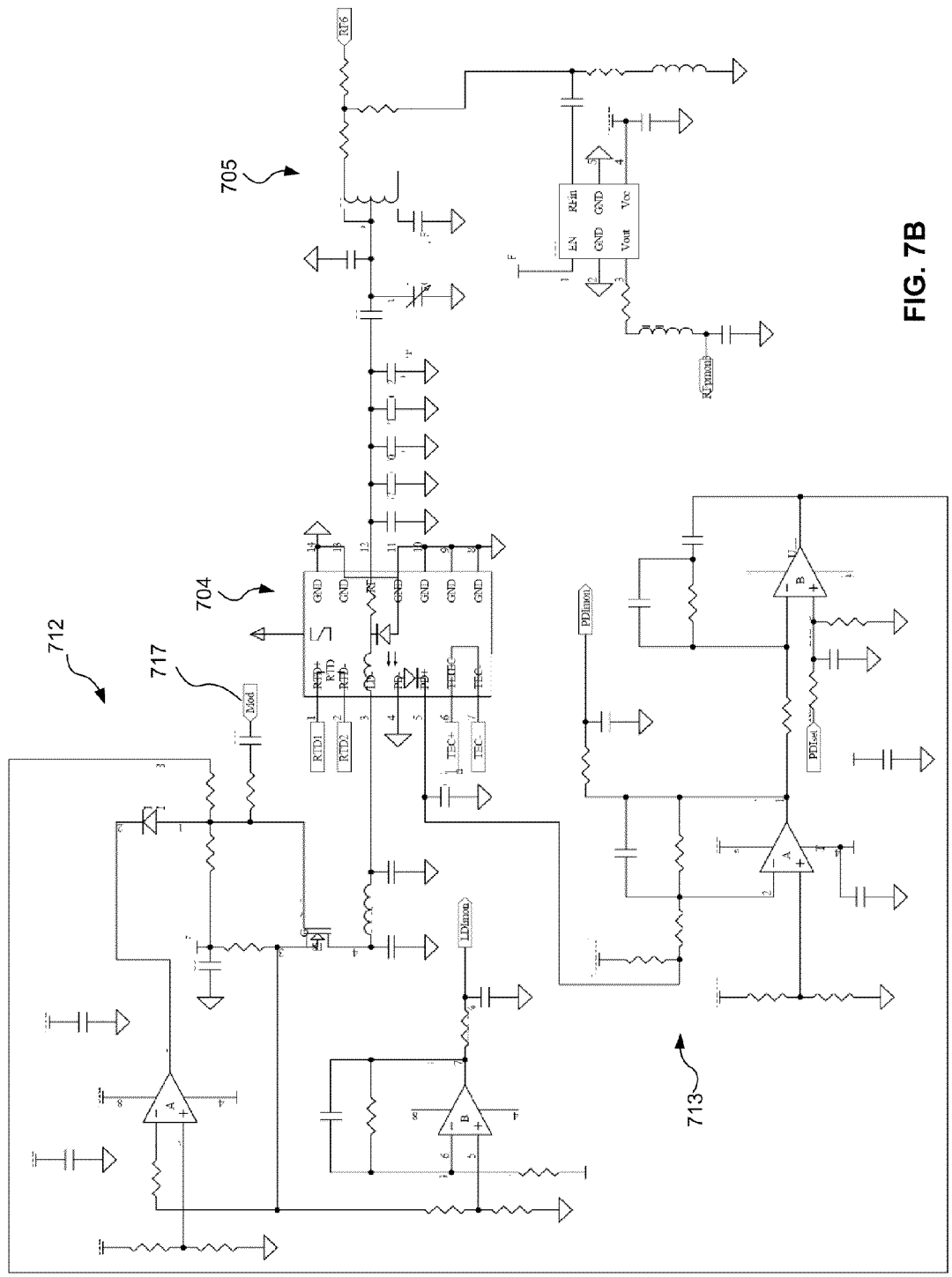
FIG. 7B is a schematic diagram of one implementation of bias control circuitry for generating a bias current in response to the anti-clipping signal generated by the envelope follower circuitry in FIG. 7A.

Referring to FIGS. 7A and 7B, specific implementations of envelope follower circuitry 710 and bias control circuitry 712 are shown in greater detail. As shown in FIG. 7A, an RF signal on an RF signal path may be received at input 706. A splitter 714 provides a portion of the RF signal power from the RF signal path to the envelope follower circuitry 710 while the RF signal continues on the RF signal path to the laser or to other circuitry before the laser, such as predistortion circuitry and/or laser driver circuitry. According to this embodiment, the envelope follower circuitry 710 includes a precision rectifier circuit 730 that detects an envelope of the RF signal to generate an anti-clipping signal. The envelope follower circuitry 710 may also include an anti-clipping limit signal input 732 that receives an anti-clipping limit signal (e.g., from a controller) such that the precision rectifier circuit 730 clamps the anti-clipping signal at the anti-clipping limit indicated by the anti-clipping limit signal.

An output 716 of the envelope follower circuitry 710 may be coupled to an input 717 of the bias control circuitry 712 shown in FIG. 7B. The bias control circuitry 712 controls a bias current in response to, at least in part, the anti-clipping signal generated to follow the envelope detected by the envelope follower circuitry 710. The bias control circuitry 712 is coupled to a laser package 704 including a laser diode such that the bias current biases the laser diode as the RF signal on the RF signal path is received by the laser diode to reduce clipping and cross modulation as described above. The laser package 704 may include, for example, a butterfly type laser package including a laser diode and monitor photodiode. The bias control circuitry 712 may also include power monitoring circuitry 713 coupled to the monitor photodiode in the laser package 704. FIG. 7B also shows one implementation of laser driver circuitry 705 coupled to the laser package 704 and configured to drive the laser diode with the RF signal on the RF signal path.

Other circuit implementations may also be used to provide the envelope follower and the bias control consistent with embodiments of the present invention. For example, those skilled in the art will recognize that the envelope follower may also be implemented using other types of envelope detector or demodulator circuitry capable of clamping the anti-clipping signal.

Accordingly, systems and methods, consistent with embodiments of the present invention, may reduce clipping by varying the bias current in response to an anti-clipping signal that follows an envelope of a multichannel RF signal and may reduce cross modulation by clamping the anti-clipping signal at a limit during lower power periods of the RF signal.

Consistent with one embodiment, a modulated optical system is provided with anti-clipping. The system includes a laser including a RF input configured to receive a multichannel RF signal, a bias input configured to receive a bias current, and an optical output configured to provide a modulated optical signal in response to the multichannel RF signal and the bias current. The multichannel RF signal includes a superposition of multiple carriers. The system also includes envelope follower circuitry configured to receive the multichannel RF signal, to detect an envelope of the multichannel RF signal and to generate an anti-clipping signal that follows at least a portion of the envelope of the multichannel RF signal. The envelope follower circuitry is configured to clamp the anti-clipping signal at an anti-clipping limit when the power of the multichannel RF signal falls below a power level. The system further includes bias control circuitry coupled to the envelope follower circuitry and to the bias input of the laser. The bias control circuitry is configured to vary the bias current provided to the laser in response to the anti-clipping signal such that at least one negative voltage spike in the RF signal is prevented from causing clipping in the laser.

Consistent with another embodiment, a method is provided for reducing clipping and cross modulation in a modulated optical system. The method includes providing a multichannel RF signal to a laser, the multichannel RF signal including a superposition of multiple carriers; detecting an envelope of the multichannel RF signal; generating an anti-clipping signal that follows at least a portion of the envelope of the multichannel RF signal; clamping the anti-clipping signal at an anti-clipping limit when the power of the multichannel RF signal falls below a power level; varying a bias current provided to the laser diode in response to the anti-clipping signal such that at least one negative voltage spike in the RF signal is prevented from causing clipping in the laser; and providing a modulated optical signal from the laser.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modulated optical system with anti-clipping, the system comprising:

a laser including a RF input configured to receive a multichannel RF signal, a bias input configured to receive a bias current, and an optical output configured to provide a modulated optical signal in response to the multichannel RF signal and the bias current, the multichannel RF signal including a superposition of multiple carriers;

envelope follower circuitry configured to receive the multichannel RF signal, to detect an envelope of the multichannel RF signal and to generate an anti-clipping signal that follows at least a portion of the envelope of the multichannel RF signal, wherein the envelope follower circuitry is configured to clamp the anti-clipping signal at an anti-clipping limit when the power of the multichannel RF signal falls below a power level, wherein the envelope follower circuitry comprises a precision rectifier circuit including at least one input and output, the precision rectifier circuit being configured to receive the multichannel RF signal, to detect the envelope of the multichannel RF signal and to produce the anti-clipping signal on the output, wherein the precision rectifier circuit is further configured to receive an anti-clipping limit signal on the input with the multichannel RF signal, wherein the anti-clipping limit signal is indicative of the anti-clipping limit, and wherein the anti-clipping signal produced on the output of the precision rectifier is prevented from falling below the anti-clipping limit; and bias control circuitry coupled to the envelope follower circuitry and to the bias input of the laser, the bias control circuitry being configured to vary the bias current provided to the laser in response to the anti-clipping signal such that at least one negative voltage spike in the RF signal is prevented from causing clipping in the laser.

2. The system of claim 1 wherein the anti-clipping limit is adjustable.

3. The system of claim 1 further comprising a controller configured to generate an anti-clipping limit signal indicative of the anti-clipping limit.

4. The system of claim 1 wherein the multichannel RF signal includes a channel under test and remaining channels, wherein the channel under test includes an unmodulated carrier and the remaining channels include modulated carriers modulated by a square wave such that the RF signal has periods of lower power and periods of higher power, and wherein the envelope follower circuitry is configured to clamp the anti-clipping signal at the anti-clipping limit during the periods of lower power to reduce cross modulation.

5. The system of claim 1 wherein the multichannel RF input signal occupies a bandwidth over a frequency range of about 50 MHz to 1000 MHz.

6. The system of claim 1 wherein the envelope follower circuitry is configured to detect a lower envelope of the multichannel RF signal, and wherein the bias control circuitry is configured to vary the bias current inversely proportional to the level of the detected lower envelope of the multichannel RF signal.

7. The system of claim 1 wherein each of at least some of the multiple modulated carriers have an optical modulation index (OMI) of at least about 4%.

8. The system of claim 1 wherein the multichannel RF signal includes at least one digital signal.

9. The system of claim 1 further comprising a delay configured to delay the multichannel RF signal prior to the laser diode.

* * * * *